United States Patent
Willers et al.

(10) Patent No.: US 10,900,576 B2
(45) Date of Patent: Jan. 26, 2021

(54) SHAFT PASSAGE AND VALVE HAVING SUCH A SHAFT PASSAGE AND METHOD FOR THE PRODUCTION OF A SHAFT PASSAGE

(71) Applicant: OTTO EGELHOF GmbH & Co. KG, Fellbach (DE)

(72) Inventors: Eike Willers, Stuttgart (DE); Rainer Maurer, Backnang (DE); Peter Bohnenstengel, Esslingen (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 332 days.

(21) Appl. No.: 15/893,928

(22) Filed: Feb. 12, 2018

(65) Prior Publication Data
US 2018/0231134 A1 Aug. 16, 2018

(30) Foreign Application Priority Data
Feb. 13, 2017 (DE) .......................... 10 2017 102 842

(51) Int. Cl.
*F16K 5/06* (2006.01)
*F16K 31/50* (2006.01)
(Continued)

(52) U.S. Cl.
CPC .......... *F16K 5/0694* (2013.01); *B23P 15/001* (2013.01); *F16C 3/02* (2013.01);
(Continued)

(58) Field of Classification Search
CPC .... F16K 41/003; F16K 41/043; F16K 41/026; F16K 41/06; F16K 31/508; F16K 5/0694;
(Continued)

(56) References Cited

U.S. PATENT DOCUMENTS

2012/0031494 A1* 2/2012 Lymberopoulos ...... F15B 20/00
137/1

FOREIGN PATENT DOCUMENTS

DE 10 2012 111 467 A1 6/2013
EP 1 876 378 A1 1/2008
(Continued)

*Primary Examiner* — Marina A Tietjen
(74) *Attorney, Agent, or Firm* — Renner, Otto, Boisselle & Sklar, LLP

(57) ABSTRACT

The invention relates to a shaft passage and a valve having such a shaft passage, as well as a method for producing a shaft passage, in which the shaft (21) has at least one drive portion (24) to which a drive for controlling the shaft (21) can be connected and has a connecting portion (25) opposite the drive portion (24), to which an actuating member (64) can be connected, and an inner shaft portion (26) in the through-bore (22) extending at least partially in the through bore (22), and having an inner shaft seal (36) to which an operating pressure of a medium to be controlled by the actuating member (64) is applied, and having a fluid shaft seal (34) which extends in the direction of the drive portion (24), and which is arranged between the inner shaft seal (34) and the outer shaft seal (42), wherein the fluid shaft seal (34) is formed between the through bore (22) and the inner shaft portion (26) of the shaft (21) and is pressure-relieved against an operating pressure of the medium to be controlled.

20 Claims, 5 Drawing Sheets

Figure 1:
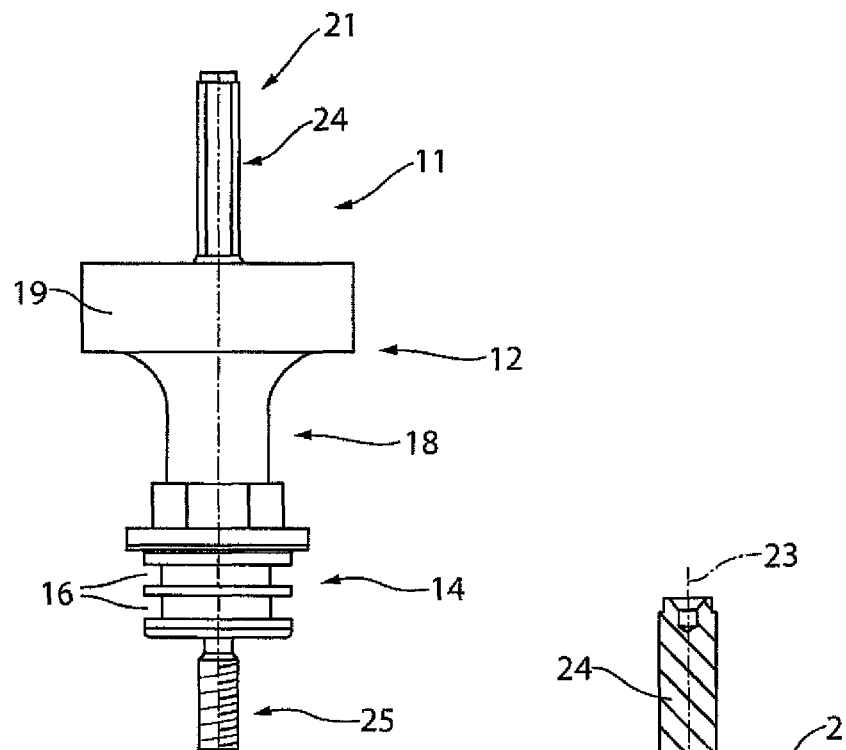

(51) Int. Cl.
*F16K 41/04* (2006.01)
*F16C 3/02* (2006.01)
*F16K 41/02* (2006.01)
*F16J 15/26* (2006.01)
*F16J 15/54* (2006.01)
*B23P 15/00* (2006.01)

(52) U.S. Cl.
CPC .......... *F16K 5/0647* (2013.01); *F16K 31/508* (2013.01); *F16K 41/026* (2013.01); *F16K 41/043* (2013.01)

(58) Field of Classification Search
CPC .. F16K 5/0647; F16C 3/02; F16J 15/26; F16J 15/44; F16J 15/54; B23P 15/001
See application file for complete search history.

(56) References Cited

FOREIGN PATENT DOCUMENTS

| | | |
|---|---|---|
| GB | 457 482 A | 11/1936 |
| GB | 1 196 553 A | 7/1970 |

\* cited by examiner

SHAFT PASSAGE AND VALVE HAVING SUCH A SHAFT PASSAGE AND METHOD FOR THE PRODUCTION OF A SHAFT PASSAGE

This application claims priority of German Patent Application No. 10 2017 102 842.0 filed Feb. 13, 2017, which is hereby incorporated herein by reference.

The invention relates to a shaft passage consisting of a housing having a through bore and a shaft which is rotatably mounted in the through bore, as well as a valve having such a shaft passage for controlling an actuating member, in particular valve closure member, and a method for the production of such a shaft passage.

A shaft passage for controlling a ball valve is known from DE 10 2012 111 467 A1. A shaft for transmitting an actuating movement to the ball valve is driven in rotation by means of a drive, said shaft being mounted in a shaft bearing and penetrating this valve. The shaft has a connecting element on the opposite end of the drive, by which a ball valve is opened and closed by a rotational movement. The shaft is sealed in the shaft housing by an inner and outer or lower and upper shaft seal. A fluid shaft seal is provided therebetween which is supplied with an oil reservoir via transverse bores which are directed radially outwards, said reservoir being bordered by a separate sealing membrane outside the shaft housing. This sealing membrane communicates with a chamber in which the ball valve is arranged, such that this sealing membrane is acted upon by the system pressure of the fluid flowing through the ball valve.

Such an arrangement has the disadvantage that the oil reservoir in the sealing membrane expands during thermal exposure and the sealing membrane is additionally acted upon by the system pressure of the fluid flowing through the ball valve, such that this outer shaft seal of the shaft passage must be designed for sealing the shaft passage and at most cannot seal sufficiently securely.

The object of the invention is to create a shaft passage and a valve having a shaft passage and a method for producing a shaft passage which enables a good seal tightness under pressure, in particular for refrigerant, and preferably requires a relatively low torque to move the shaft.

This object is solved by a shaft passage in which the shaft is rotatably mounted in a through bore of the housing and has an inner and outer shaft seal as well as a fluid shaft seal therebetween, wherein the fluid shaft seal is formed in a region between the through bore of the housing and an inner shaft portion of the shaft and the fluid shaft sealing is depressurised compared with an operating pressure of the medium to be controlled. Only the inner or lower shaft seal, which is assigned, for example, to a regulating chamber or a pressure chamber of a medium to be controlled, is acted upon by the pressure of the medium flowing through or to be controlled. The fluid shaft seal itself, however, is arranged separately to the operating pressure of the medium to be controlled behind the inner shaft seal or opposite the side of the inner shaft seal which is acted upon by the fluid pressure, so that an additional compression load of the fluid to be controlled does not act on the fluid shaft seal. The through bore is preferably formed continuously—i.e. without interruption—in the region of the fluid shaft seal. The outer or upper shaft seal thus acts as a type of replacement seal for the lower or inner shaft seal. Good seal tightness on the one hand and a well-lubricated mounting of the shaft in the through bore on the other hand can thus be achieved.

A preferred embodiment of the shaft passage provides that the fluid seal is limited relative to the operating pressure of the medium to be controlled in the axial direction by the inner and outer shaft seal and in the radial direction by the shaft portion of the shaft and the through bore, in particular the inner wall of the through bore. The inner shaft seal, the fluid shaft seal and the outer shaft seal are thus connected in series, so that exclusively the inner shaft seal absorbs the operating pressure of the medium to be controlled.

At least one axial and/or radial bearing is provided for mounting of the shaft in the through bore, which is arranged adjacent to the fluid shaft seal or adjoins the fluid shaft seal. This has the advantage that the axial and/or radial bearing is lubricated simultaneously by the fluid in the fluid shaft seal, in particular oil, such as refrigerator oil or compressor oil.

Furthermore, at least one annular gap having a constant gap width for forming the fluid shaft seal is preferably formed within the inner shaft portion of the shaft. An additional radial mounting of the shaft in the through bore can thus be supported.

Furthermore, the inner shaft seal is preferably secured pointing in the axial direction relative to the medium to be controlled by at least one inner bearing or a support disc or an inner shoulder of the housing. A simple construction can thus be created, wherein a first pressure drop in the operating pressure of the medium to be controlled is enabled by the inner bearing, the support disc or the shoulder of the housing.

Furthermore, the inner bearing arranged relative to the inner shaft seal and/or the inner support disc are preferably fixedly arranged on the shaft. This enables a simple assembly of the shaft in the through bore.

In a first embodiment of the shaft passage, a bearing is preferably provided on an inner and outer end of the fluid shaft seal respectively, which preferably adjoins the fluid shaft seal directly. The bearings can thus be directly moistened with the fluid and the shaft seals arranged respectively outside the bearing can preferably enable an axial sealing inwardly and outwardly towards the housing.

Furthermore, a compensating chamber opposite the fluid shaft seal is preferably assigned respectively to one of the two bearings or to both bearings which border the fluid shaft seal or are arranged on the fluid shaft seal. This compensation chamber is formed by an annular gap which is preferably filled with a compressible fluid, in particular air. The fluid expanding during thermal exposure can pass into this annular gap and form volume compensation.

Furthermore, the first embodiment advantageously has at least one support disc which is assigned to the inner and/or outer shaft seal and the inner and/or outer shaft seal and the respective support disc is displaceably bordered in the axial direction between the bearing adjoining the fluid shaft seal and a further bearing or a housing portion of the housing. This displaceability of the inner and/or outer shaft seal and the respectively assigned support disc relative to the fluid shaft seal has the advantage that, during thermal exposure from the outside and an expansion of the fluid in the gap of the fluid shaft seal, a compensation can be created by the support disc being axially moveable with the outer shaft seal. Overpressure in the annular gap of the fluid shaft seal can thus be prevented. By the assignment of the support disc to the shaft seal, a secured travelling movement of the shaft seal along the shaft portion of the shaft is enabled.

According to a further alternative embodiment of the invention, an axial and/or radial bearing is arranged on an inner end of the inwardly directed shaft portion of the shaft, said bearing interacting with a housing portion in the through bore as a guide for the inner shaft seal and with at least one support disc. This enables a simple assembly and a compact construction.

A support disc and an inner shaft seal, as well as preferably a free annular gap, are preferably provided in the through bore between the axial and/or radial bearing and a shoulder bordering the guide, and the support disc and the inner shaft seal are displaceably mounted. This in turn enables a compensation volume to be created in the fluid shaft seal in the event of thermal expansion of the fluid. Additionally, by limiting the axial displaceability of the inner shaft seal towards the outer shaft seal by the shoulder in the through bore, it can in turn be ensured that an operating pressure acting on the inner seal is not transmitted to the outer shaft seal, rather this operating pressure is kept away from the outer shaft seal.

A further preferred embodiment of this second alternative embodiment provides the fluid shaft seal between the housing portion in the through bore and an outer stopper arranged on the through bore of the housing, said fluid shaft seal being bordered outwardly by the outer shaft seal and a further outer support disc, wherein a free annular gap for a compensation chamber is formed in particular between the outer support disc and/or the outer shaft seal on one hand and the stopper on the other hand. Firstly, the closed chamber for the fluid shaft seal can thus in turn be formed, which is arranged separately from the operating pressure of the medium to be controlled. Furthermore, an in particular second free annular gap can additionally be created, in order to enable a compensating volume during thermal heating of the medium of the fluid shaft seal.

In this second alternative embodiment it is thus preferably provided that the outer shaft seal adjoining the fluid shaft seal and the support disc assigned to the outer shaft seal are displaceable in the axial direction and their displaceability is limited by the housing portion or the adjoining fluid and an outer stopper.

A further alternative embodiment of the shaft passage advantageously provides that a fluid shaft seal is created between the inner and outer shaft seal, in which the full volume of the fluid is lower than the volume of the chamber which is formed between the inner and outer shaft seal and the through bore of the shaft. A compensation volume is thus provided within the two shaft seals. Preferably, a radial and/or axial bearing is provided outside the inner and outer shaft seal respectively. The internal shaft seals can thus be secured in the axial direction.

Furthermore, the first and second shaft seal are preferably formed as an O-ring seal, an X-ring seal or as a groove ring seal. The X-ring seal in particular has the advantage that two seals connected in series are effectively created, by means of which good seal tightness is achieved.

An assembly portion is preferably provided on the housing of the shaft passage, which comprises at least one sealing element. The interface between the shaft passage and the actuating member to be controlled by the shaft, said member being in turn arranged in a housing, can thus be sealed.

Furthermore, the fluid shaft seal preferably has a ratio of a length to a width of the annular gap in a range of 25:1 to 1:1. Additional friction minimisation, in particular for very long and narrow gaps for the fluid shaft seal, can be achieved with a simultaneously rotating drive of the shaft in the shaft passage. The mounting can also simultaneously be improved.

The object of the invention is further solved by a valve, in particular for a cooling system, which comprises a housing having an inlet opening and an outlet opening, which are connected to one another by a canal which comprises a flow opening and is in communication with a regulating chamber or pressure chamber. The through-opening can be controlled by an actuating member or a valve closure member, wherein an activating device is provided, by means of which the valve closure member can be driven into an open and closed position relative to a valve seat which is provided in the through-opening. This activating device comprises at least one valve passage according to one of the embodiments described above, which can be disposed on the housing of the valve, wherein the valve closure member is arranged on the connecting portion of the shaft from the shaft passage. An opening and closing movement of the valve closure member can thus be controlled by the shaft and the connection point in the housing for receiving the shaft passage can simultaneously be sealed. An operating pressure of the medium to be controlled is applied to this connection point.

The activating device preferably comprises a drive which engages the drive portion of the shaft. This drive is arranged outside the valve and preferably also outside the shaft passage, whereby a simple accessibility and construction independent of the medium or fluid to be controlled, in particular refrigerant, is possible.

Furthermore, the valve closure member is preferably guided with axial displacement and with rotation prevention in a pressure chamber which is in communication with the through bore. A rotating drive of the shaft can thus be converted to an axial movement component along the longitudinal axis of the shaft for opening and closing the valve closure member. The valve closure member is preferably provided by means of a thread on the connection portion of the shaft.

A further advantageous embodiment of the valve provides that the valve closure member can be disposed on the high pressure side or the low pressure side relative to the through bore and can be controlled with the shaft passage according to one of the preceding claims. This shaft guide can be assigned to either a high pressure side or a low pressure side pressure chamber in order to enable a corresponding control of the valve.

The object of the invention is further solved by a method for producing a shaft passage, in particular according to one of the preceding embodiments of the shaft passage, which comprises a shaft which is rotatably mounted in a through-bore in the housing, and comprises at least one inner and outer shaft seal and a fluid shaft seal which is arranged therebetween, in which an inner shaft seal is inserted into the through bore or an inner shaft seal is applied to the shaft, in which the shaft is introduced into the through bore of the housing, such that the inner shaft seal is positioned between the housing and the shaft, in which an annular gap which is formed between the through bore and the shaft portion and which is defined by the inner shaft seal is filled with a predetermined volume of fluid, in which the annular gap filled with fluid is subsequently closed by an outer shaft seal acting between the through bore and the shaft portion and the shaft is moved into an end position within the housing. This sequence of work steps has the advantage of enabling a quick filling of the chamber of the fluid shaft seal with a fluid as well as a secure assembly.

A further preferred embodiment of the method provides that, before the insertion of the shaft into the through bore, the inner shaft seal, preferably a support portion and an inner bearing are applied to the shaft or inserted into the through bore, and after the filling of the annular gap, the outer bearing is applied to the shaft and, according to a first alternative, the shaft is pushed into an end position, in order to subsequently introduce the outer shaft seal to at least one support disc assigned to this shaft seal, an axial bearing and preferably a stop ring. The second alternative provides that the outer shaft seal, preferably at least one support disc and an axial bearing, as well as preferably a stop ring, are applied to the shaft after the filling of the annular gap or even before the filling of the annular gap, though only when the positioning of the shaft for filling has been carried out, and the shaft is filled and finally pushed into the end position.

A further alternative embodiment of the method provides that the shaft is fully pre-assembled and afterwards inserted into the through bore. Here the pre-assembled shaft is at least equipped with an inner and outer bearing which adjoin the fluid seal. Furthermore, at least one inner and outer shaft seal as well as preferably at least one support disc assigned respectively to this inner and outer seal are preferably applied. Furthermore, an axial bearing ring and preferably a stop ring are applied in the direction of the drive portion after the application of the outer shaft seal and the support ring, which preferably fixes the axial bearing ring in the position relative to the shaft.

Provided that the pre-assembled shaft is inserted into the through bore according to this embodiment, the fluid can be introduced into the annular gap before the outer bearing on the shaft is introduced into the through bore and closes the annular gap between the shaft portion and the through bore. Alternatively, it can be provided that, with a pre-assembled shaft, this is fully inserted into the through bore until it reaches its end position, so that the annular gap is subsequently filled with fluid via a cross bore in the housing and after the filling this cross bore is closed. This can be take place, for example, by compression by means of a stopper, a ball or the like.

A further advantageous embodiment of the method provides that at least one axial and/or radial bearing is applied to the stop portion on to the shaft portion facing the stop portion before the transfer of the shaft into the end position. Such an arrangement has the advantage that the length of the mounting can be formed to be shorter and nevertheless enables a simplified assembly.

Furthermore, at least one free annular gap is formed in the axial direction between the shaft portion of the shaft and the through bore as a compensation volume or compensation chamber. This enables the expanding fluid to be able to be collected in the compensation chamber during thermal exposure without additional forces on the inner and outer shaft seal being generated, whereby an increased torque would be required during the control of the shaft.

Furthermore, after the shaft assumes the end position, a stopper is introduced or pressed into the through bore of the housing. A further axial securing of the shaft to the housing can thus take place or of the components applied to the shaft can be enabled.

A further alternative embodiment of the method provides that, after the filling of the annular gap with a fluid, the outer shaft seal is positioned relative to the inner shaft seal in such a way that a free annular gap is formed between the fluid provided in the annular gap and the outer shaft seal. A compensation volume between two seals can thus be created in a simple manner.

Figure 2:
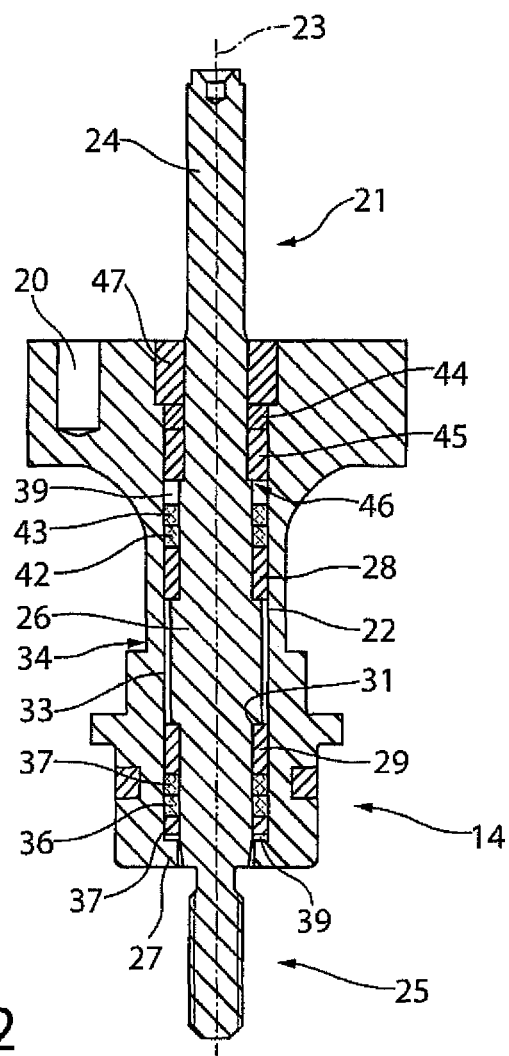
Figure 3:
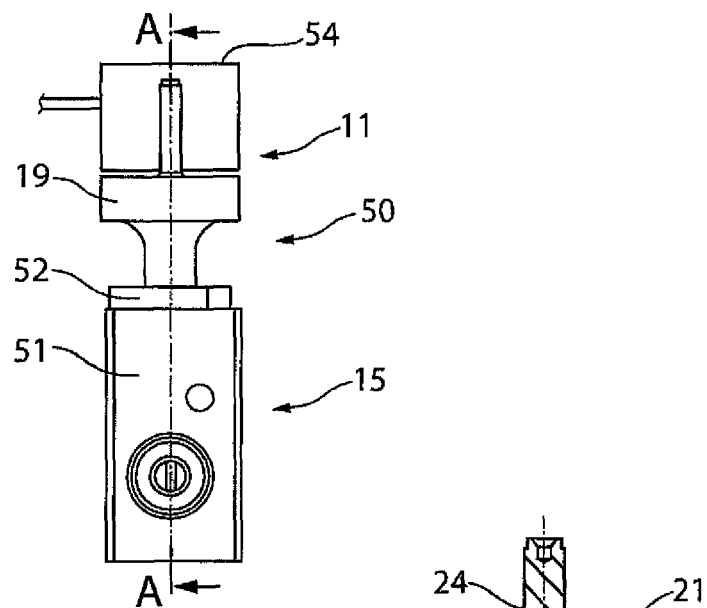
Figure 4:
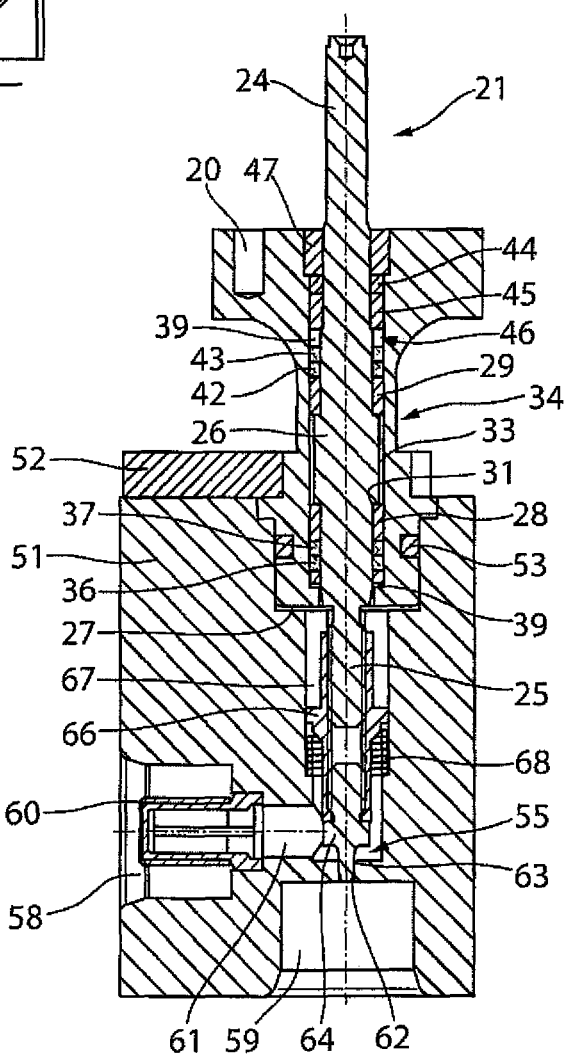
Figure 5:
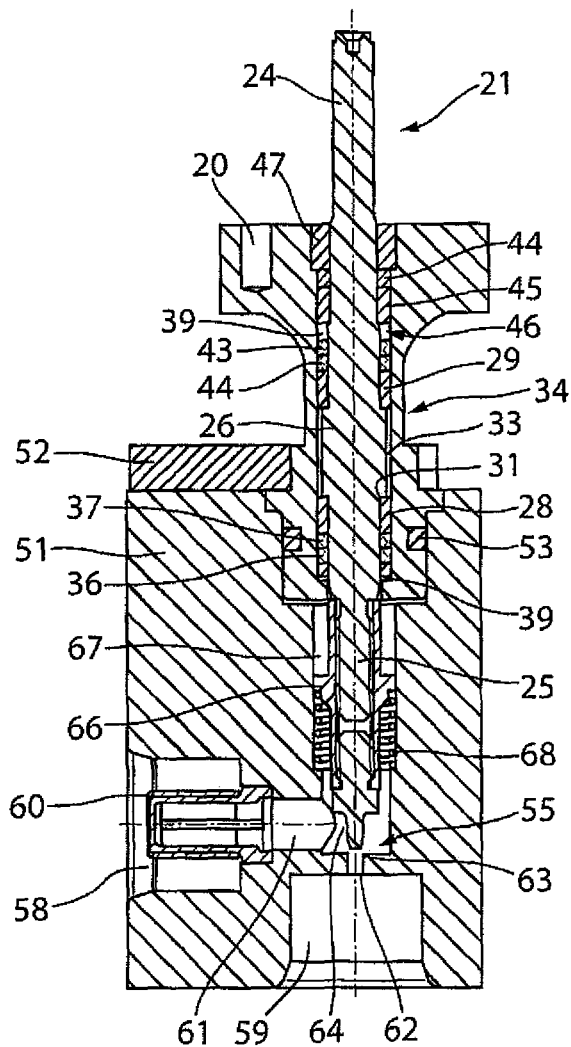
Figure 6:
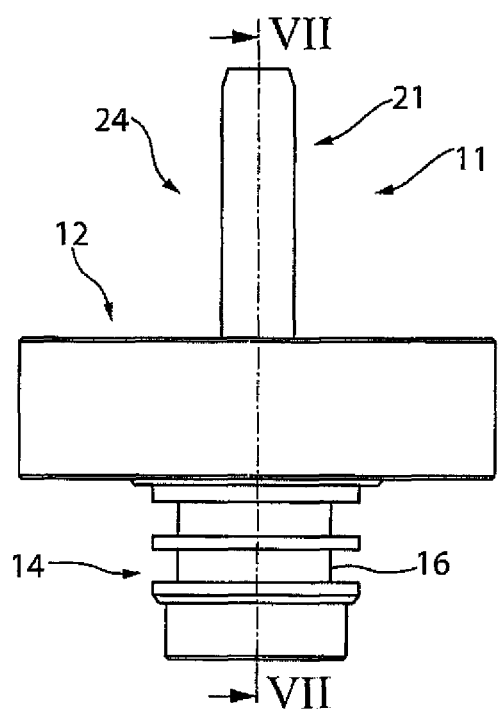
Figure 7:
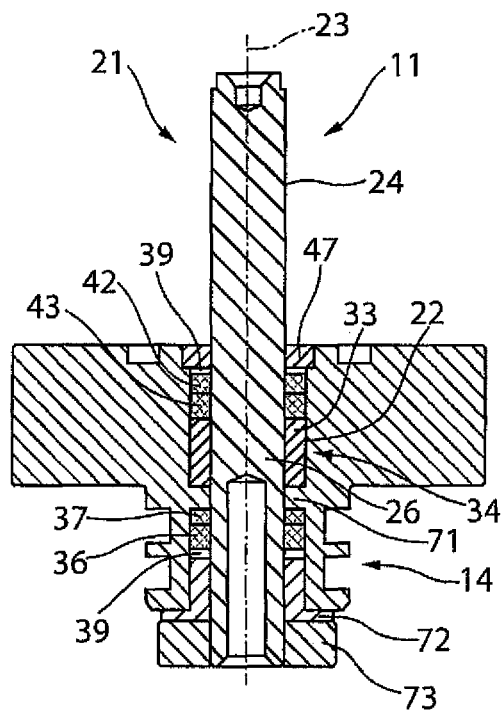
Figure 8:
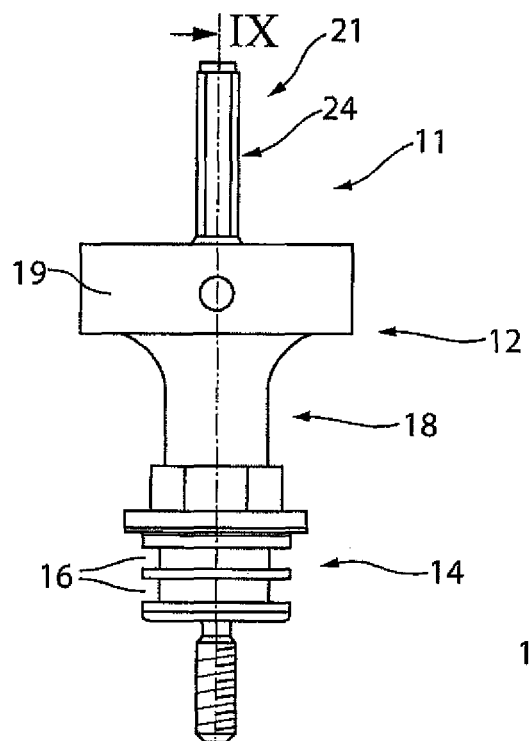
Figure 9:
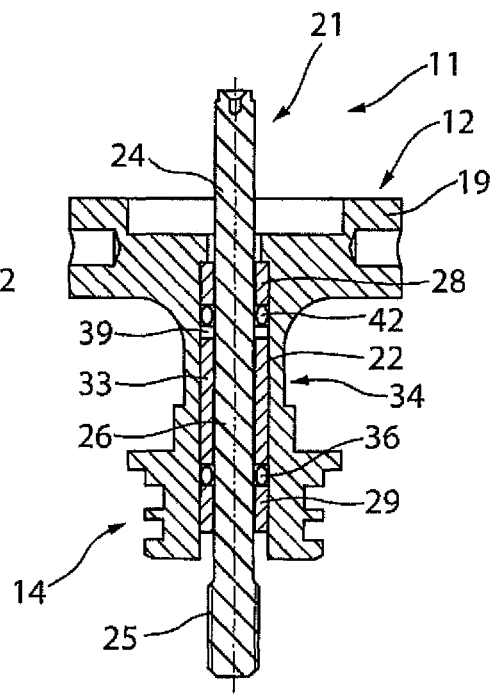

The invention as well as other advantageous embodiments and developments of the same shall be described and explained in more detail in the following, with reference to the examples depicted in the drawings. The features to be taken from the description and the drawings can be inventively applied individually or in any combination. Herein:

FIG. 1 shows a schematic side view of a shaft passage,

FIG. 2 shows a schematic sectional view of the shaft passage according to FIG. 1, FIG. 3 shows a schematic side view of a valve having the shaft passage according to FIGS. 1 and 2, FIG. 4 shows a schematic sectional view of the valve according to FIG. 3 in a closed position, FIG. 5 shows a schematic sectional view of the valve according to FIG. 3 in an open position, FIG. 6 shows a schematic view of an alternative embodiment of the shaft passage to FIG. 1, FIG. 7 shows a schematic sectional view of the shaft passage according to FIG. 6, FIG. 8 shows a schematic side view of an alternative embodiment of the shaft passage to FIG. 1, FIG. 9 shows a schematic sectional view of the shaft passage according to FIG. 8, and FIGS. 10*a-d* show individual steps for the production of the shaft passage according to FIG. 6 in schematic sectional views.

In FIG. 1, a schematic side view of a shaft passage 11 is depicted. FIG. 2 shows a schematic sectional view of the shaft passage 11 according to FIG. 1.

The shaft passage 11 comprises a housing 12, which comprises, for example, an assembly portion 14 which is provided for connection to a further component such as, for example, a valve 15 according to FIGS. 3 to 5. This assembly portion 14 can have one or several grooves 16 for receiving sealing elements 53. Furthermore, the housing 12 has a tubular body 18, which can have various cross-sections. For example, a flange portion 19 with increased diameter is provided, to which, for example, a drive 54 (FIG. 3) can be fastened. This flange portion 19 can likewise have an auxiliary bore 20 or similar for assembly of the shaft passage 11.

The shaft passage 11 has a shaft 21 which is rotatably mounted in a through bore 22 of the housing 12. The shaft 21 advantageously extends fully through the housing 12 and has an upwardly protruding or outer drive portion 24. Opposite, a connecting portion 25 is provided, which protrudes inwards relative to the housing 12 or protrudes downwardly. A shaft portion 26 is formed therebetween which extends in the region of the through bore 22. The rotatable bearing of the shaft 21 as well as its sealing inwards or downwards in the axial direction along the longitudinal axis 23 and upwards or outwards is described in detail below.

When specifying the direction, "inwards" or "inner" should be understood to mean that the connecting portion 25 is arranged in a housing 51 of a further component such as, for example, a valve 15, by which a mass flow of a pressurised medium is to be controlled. When specifying "outwards" or "outer", this means the direction in which the drive portion 24 of the shaft 21 is provided or an ambient pressure acts.

The housing 12 preferably has a stepped through bore 22, wherein the through bore 22 is bordered in the direction towards the connecting portion 25 of the shaft 21 by an inner shoulder 27 protruding radially inwards.

The shaft 21 is guided by two bearings 28, 29 within the through bore 22. These bearings 28, 29 can be formed as axial and/or radial bearings. These two bearings 28, 29 each engage a shoulder 31 on an inner shaft portion 26 of the shaft 21. An annular gap 33 is formed therebetween. This annular gap 33 is filled with a medium, in particular oil. A fluid shaft seal 34 is thus formed. An inner shaft seal 36 and preferably a support disc 37 or support ring are joined to the inner bearing 29 in the direction of the connecting portion 25. In addition, a further support disc 37 can also be arranged between the inner shaft seal 36 and the bearing 29. At least the support disc 37 and the inner shaft seal 36 are axially displaceably mounted. A compensation chamber 39 in the form of a gap can be formed between the support disc 37 and the shoulder 27 of the housing 12.

During thermal heating of the fluid in the fluid shaft seal 34, the fluid can pass the bearing 29 at least partially, and act in the direction of the inner shaft seal 36. An overpressure in the fluid shaft seal 34 which can act disadvantageously on the friction between the inner shaft seal 36 and the shaft 21 or the through bore 22 can be prevented by the displaceable arrangement of the inner shaft seal 36 in the direction of the compensation chamber 39.

An analogous construction to the bearing 29 is provided to the outer bearing 28 in the direction of the drive portion 24. An outer shaft seal 42 and an adjoining further support disc 43 are preferably provided. In the axial direction as seen outwardly, an operating chamber 39 can in turn be provided.

In this embodiment of the shaft passage 11, a further radial and/or axial bearing 45, in particular an axial bearing 45, is furthermore advantageously provided. This abuts a shoulder 46 of the shaft 21. The size of the operating chamber 39 can be determined by the axial distance of the shoulder 46 on the shaft portion 26 of the shaft 21 from the shoulder 31 or the components arranged therebetween. In addition, another stop ring 44 can be provided between a stopper 47 and the bearing 45. The axial bearing 25 can be fixed by the stopper 47 in a defined position within the through bore 22 by means of the stop ring 44. The stopper 47 is preferably pressed into the through bore 22.

The connecting portion 25 of the shaft 21 can be formed, for example, as a thread. The drive portion 24 can be formed, for example, as a polygon or square or comprise further connection or coupling elements.

A closed chamber is formed together with the through bore 22 by the fixed positioning of the bearing 28, 29 relative to the respective shoulder 31 of the shaft 21, in order to form the fluid shaft seal 34. A pressure applied to an inner side of the housing 12 or to an inner side of the through bore 22 is received exclusively by the inner shaft seal 36, which is braced against the bearing 29. The fluid shaft seal 34 is pressure-relieved against this pressure which is applied. The outer shaft seal 42 can thus serve as a so-called replacement seal and assume a safety function.

In FIG. 3, a schematic side view of the shaft passage 11 according to FIGS. 1 and 2 is depicted, which is fastened with the assembly portion 14 to a housing 51 of the valve 15. A flange plate 52, for example, is provided for this purpose, for which the assembly portion 14 is arranged in a corresponding portion of the housing 51. Sealing elements 53, in particular sealing rings, are received by the grooves 16 in order to seal these connection interfaces.

FIG. 4 shows a schematic sectional view of the valve 15 having the shaft passage 11 and an actuating member arranged thereon or valve closure member 64 in a closed position 55. FIG. 5 shows the valve 15 having the shaft passage 11 in an open position 56.

The valve 15 has an inlet opening 58 and an outlet opening 59 in the housing 51, which are connected to each other by a channel 61. A filter 60 can preferably be provided in the inlet opening 58 and/or in the outlet opening 59. This comprises a through-flow opening 62, which is enclosed by a valve seat 63. A valve closure member 64 abuts this valve seat 63 in the closed position 55. The valve closure member 64 is received via a fastening sleeve 66, which has a thread opposite this member, said thread engaging a thread formed as connecting portion 25. The fastening sleeve 66 is displaceably guided in a pressure chamber 67 which communicates with the through-opening 62 along a longitudinal axis which preferably corresponds to the longitudinal axis of the shaft 21. The fastening sleeve 66 is simultaneously non-rotatably received in the pressure chamber 67. A return spring 68 acts on the fastening sleeve 66, said return spring supporting an opening movement of the valve closure member 64 and acting in the direction of the shaft passage 11.

An activating device 50 is provided for activating the valve 15 from the closed position 55 according to FIG. 4 into the open position 56 according to FIG. 5. This comprises, for example, the shaft passage opening 11 as well as a drive 54. This drive 54 can be formed as an electric drive, in particular an electric motor or a drive which is otherwise controlled. A rotational movement of the shaft 21 around the longitudinal axis 23 is controlled by the drive 54. Due to this rotational movement, the fastening sleeve 66 is moved in the direction of the shaft passage 11, because the anti-rotation means prevents the fastening sleeve 66 from rotating, such that a clean axial movement is produced and the valve closure member 64 is lifted from the valve seat 63 and opens the through-opening 62.

In the opening position 56 of the valve 15, the high pressure of a medium to be controlled, in particular a refrigerant, acting on the inlet opening 58 abuts an inner side of the shaft passage 11. This high pressure of the medium acts on the support surface 27 and afterwards on the inner shaft seal 36. The fluid shaft 34 is not directly subjected to the pressure of the medium to be controlled which is applied in the valve 15.

In an alternative embodiment, not depicted in more detail, of the valve 15 having the shaft passage 11, the valve closure member 64 and the control via the shaft passage 11 can be provided on the low pressure side, i.e. the valve closure member 64 is arranged within the outlet opening 59 and opens and closes the through-opening 62.

The valve 15 according to FIGS. 4 and 5 can also be flowed through in the opposite direction, i.e. the medium to be controlled flows from the outlet opening 59 to the inlet opening 58.

In FIG. 6 a schematic side view and in FIG. 7 a schematic sectional view of the shaft passage 11 according to FIG. 6 along the line VII-VII are depicted. This alternative embodiment differs from the embodiment described above in that the housing 12 has a tubular body 18 which is shortened compared to FIG. 1.

In this embodiment, the shaft 21 can have, for example, a continuously cylindrical outer periphery over the entire length. The through bore 22 in the housing 12 comprises a housing portion 71 in the form of a constriction of the through bore 22. On an inner portion of the through bore 22, an axial and radial bearing 72 is provided on the shaft 21, which is secured in the axial direction by the one axial securing means 73 that engages the shaft 21 directly. Between the axial and radial bearing 72 and the housing portion 71, a support disc 37 as well as an inner shaft seal 36 are provided in the through bore 22. Outside the housing portion 71, the annular gap 33 is provided for forming the fluid shaft seal 34. The annular gap 33 is in turn bordered by a support disc 37 and an outer shaft seal 42.

The outer shaft seal 42 and the adjacent support disc 43 are in turn axially secured by the stopper 47 in the through bore 22.

In this embodiment, an operating chamber 39 can be formed adjacent to the inner shaft seal 36 and/or outer shaft seal 42, said operating chamber having the same function as in the shaft passage 11 according to FIGS. 1 and 2.

In FIG. 8, a further schematic side view of the shaft passage 11 to FIG. 1 is depicted. FIG. 9 shows a schematic sectional view along the line IX-IX in FIG. 8.

In this embodiment, a simplified structure is provided. The annular gap 33 is formed between the shaft 21 and the through bore 22, said annular gap being bordered by an inner shaft seal 36 and an outer shaft seal 42.

In this embodiment, the amount of fluid introduced into the annular gap 33 for forming the fluid shaft seal 34 is lower than the total volume which is enclosed by the shaft seals 36, 42, such that a compensation chamber 39 for the fluid of the fluid shaft seal 34 is simultaneously also provided within the annular gap 33 during thermal expansion. The bearing 28, 29 is provided outside the inner shaft seal 36 and the outer shaft seal 42 respectively. The inner shaft seal 36 and the outer shaft seal 42 bear respectively against this if an increased pressure in the fluid shaft seal 34 should arise. The inner and/or outer shaft seal 36, 42 are preferably axially displaceable. One or both shaft seals 36, 42 can also be secured axially with respect to the shaft 21.

The inner and outer shaft seal 36, 42 is preferably formed as a groove ring in this embodiment.

In FIGS. 10a to 10d, schematic sectional views of individual steps for the production of the shaft passage 11 according to the embodiments of FIGS. 6 and 7 are depicted.

Figure 10A:
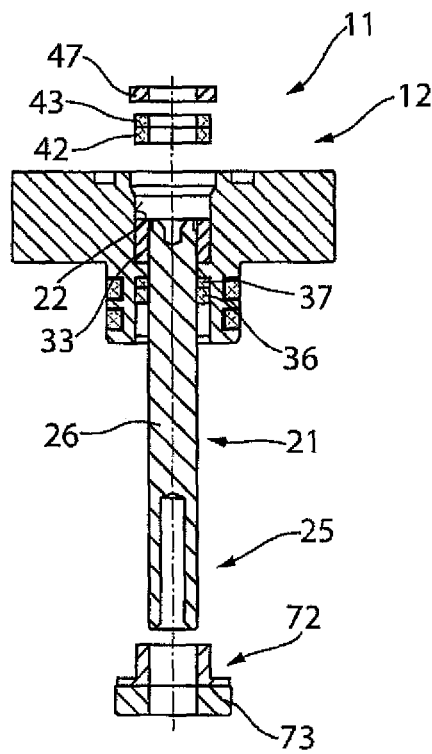

FIG. 10a shows a first step. First, the inner shaft seal 36 and preferably the support disc 37 are inserted into the inner portion of the through bore 22, or the inner shaft seal 36 and preferably the support disc 37 are applied to the shaft portion 26 of the shaft 21. The shaft 21 is subsequently inserted into the through bore 22 and is introduced until a drive portion 24 is positioned above the housing portion 71 but still within the through bore 22. A filling of the remaining annular gap 33 between the through bore 22 and the shaft 21 with a fluid then takes place.

Figure 10B:
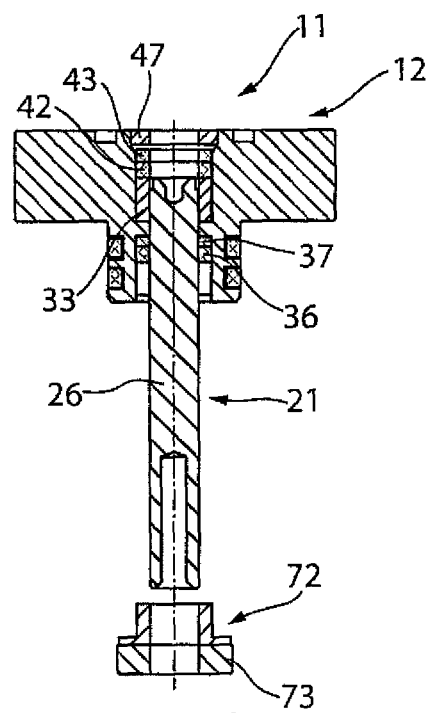

In a subsequent step according to FIG. 10b, the outer shaft seal 42 and the support disc 43 are inserted and are axially secured by means of the stopper 47 in the through bore 22.

Figure 10C:
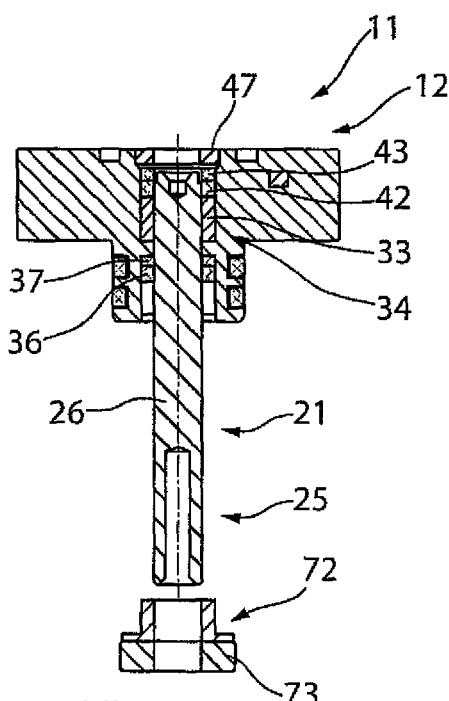
Figure 10D:
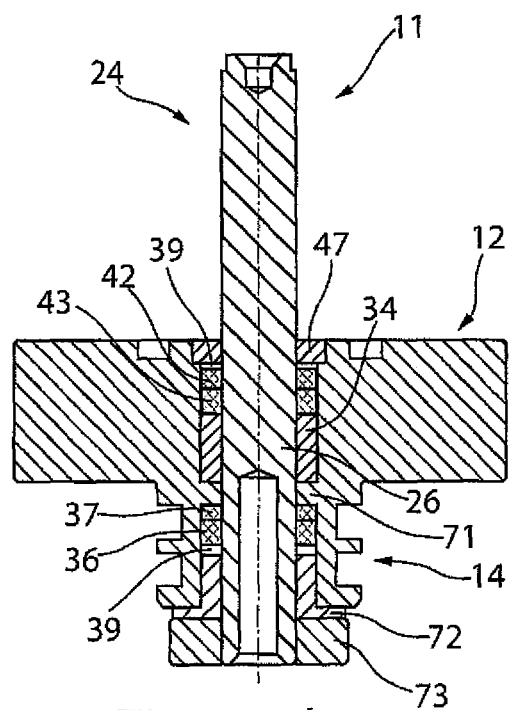

Subsequently, in a further step according to FIG. 10c, the shaft 21 is first pushed further in the direction of the stopper 47 until an end face of the shaft 21 is flush with the support disc 43. The region E is subsequently cleaned by the medium which is introduced for the fluid shaft seal 34. The axial and radial bearing 72 is subsequently assembled on the opposite connecting portion 25 and is secured on the shaft 21 by the axial securing means 73. Finally, the shaft 21 is guided further through the through bore 22 until the axial and radial bearing 72 engages the through bore 22 and is fixed in particular on the inner portion of the through bore 22.

By the selection of the length of the axial and radial mounting 72 or the corresponding matching portion of the through bore 22 or the shaft portion 26, the size of the compensation chamber 39 adjacent to the inner shaft seal 36 can be determined.

The invention claimed is:

1. Shaft passage consisting of a housing having a through bore and a shaft which is rotatably mounted in the through bore, wherein the shaft has at least one drive portion, to which a drive for controlling the shaft can be connected and has a connecting portion opposite the drive portion, to which an actuating member can be joined, and a shaft portion extending at least partially into the through bore, and having an inner shaft seal, against which an operating pressure of a medium to be controlled with the actuating member bears, and having a fluid shaft seal which extends in the direction of the drive portion, and which is arranged between the inner shaft seal and an outer shaft seal, wherein the fluid shaft seal is formed between the through bore and an inner shaft portion of the shaft and is pressure-relieved relative to an operating pressure of the medium to be controlled, wherein at least one axial and/or radial bearing is provided between the inner shaft portion and the through bore adjacent to the fluid shaft seal or adjoins the fluid shaft seal, and wherein the outer shaft seal and/or the inner shaft seal are displaceably bordered in an axial direction between a first bearing of the at least one axial and/or radial bearing that adjoins the fluid shaft seal and a second bearing, or a housing portion of the housing.

2. Shaft passage according to claim 1, wherein within the inner shaft portion of the shaft, the fluid shaft seal has at least one annular gap having a constant gap width.

3. Shaft passage according to claim 1, wherein the inner shaft seal is secured in the axial direction at least by an inner bearing of the at least one axial and/or radial bearing or an inner shoulder of the housing.

4. Shaft passage according to claim 1, wherein the axial and/or radial bearing includes an inner bearing that is assigned to the inner shaft seal or to a support disc, or to both, and is fixedly arranged on the shaft.

5. Shaft passage according to claim 1, wherein the at least one axial and/or radial bearing includes axial and/or radial bearings that border the fluid shaft seal, wherein outside the axial and/or radial bearings bordering the fluid shaft seal, a compensation chamber is assigned to the axial and/or radial bearings on one or both sides.

6. Shaft passage according to claim 1, wherein at least one support disc is assigned to the outer and/or inner shaft seal, and that at least one support disc is displaceably bordered in the axial direction between the at least one axial and/or radial bearing adjoining the fluid shaft seal and the second bearing, or the housing portion of the housing.

7. Shaft passage according to claim 1, wherein the at least one axial and/or radial bearing includes an axial and radial bearing arranged on an inner end of the inner shaft portion of the shaft, said axial and radial bearing interacting with the housing portion for positioning the inner shaft seal and at least one support disc.

8. Shaft passage according to claim 7, wherein the inner shaft seal and the at least one support disc are displaceably received between the housing portion and the axial and radial bearing and an operating space is provided.

9. Shaft passage according to claim 7, wherein the fluid shaft seal is provided between the housing portion and a stopper arranged outside on the through bore, said fluid shaft seal being bordered outwardly by the outer shaft seal and the at least one support disc, and a compensation chamber is provided between the outer shaft seal and the stopper and wherein the outer shaft seal and the support disc are bordered in axial movement along the inner shaft portion by at least one housing portion and the stopper.

10. Shaft passage according to claim 1, wherein a filling volume of the fluid is lower than a chamber volume, which is formed by the inner and outer shaft seal as well as the through bore and the inner shaft-portion of the shaft.

11. Shaft passage according to claim 1, wherein the fluid shaft seal has a ratio of a length to an annular gap width of 25:1 to 1:1.

12. Valve having a housing having an inlet opening and an outlet opening, which are connected to a channel comprising a through-opening which is in communication with a pressure chamber, having a valve closure member which opens and closes a valve seat arranged on the through-opening and having an activating device, by which the valve closure member can be controlled in an open and closed position, wherein the activating device comprises at least one shaft passage according to claim 1, which is fastened on the housing and the valve closure member is provided on the connecting portion of the shaft.

13. Valve according to claim 12, wherein the activating device comprises a drive which engages the drive portion of the shaft.

14. Valve according to claim 12, wherein the valve closure member is guided with axial displacement and with rotation prevention in the pressure chamber which is connected to the through-opening.

15. Method for producing the shaft passage according to claim 1, the method comprising:
   inserting an inner shaft seal into the through bore or applying the inner shaft seal to the shaft,
   introducing the shaft into the through bore of the housing such that the inner shaft seal is positioned between the housing and the shaft portion of the shaft,
   forming an annular gap between the through bore and the shaft, which is bordered in one direction by the inner shaft seal, the annular gap being filled by a predetermined volume of fluid,
   subsequently closing the fluid-filled annular gap by an outer shaft seal acting between the through bore and the shaft and
   moving the shaft within the housing into an end position relative to the housing.

16. Method according to claim 15, wherein
   before the insertion of the shaft into the through bore, the inner shaft seal and an inner bearing are applied to the shaft or inserted into the through bore, and after the filling of the annular gap, the outer bearing is applied to the shaft and the shaft is pushed into an end position relative to the through bore and subsequently at least the outer shaft seal, preferably at least one support portion, and the axial bearing and preferably a stop ring are introduced, or
   after the filling of the annular gap, the outer bearing is applied to the shaft and subsequently at least the outer shaft seal and the axial bearing and preferably a stop ring are applied and finally the shaft is pushed into the end position into the through bore.

17. Method according to claim 16, wherein at least one inner and outer bearing are applied to the shaft adjacent to the fluid seal, and at least the inner shaft seal and preferably the at least one support disc are applied in the direction of the connecting portion of the shaft and the outer shaft seal and at least one support disc as well as an axial bearing are introduced in the direction of the drive portion and the pre-assembled shaft is inserted into the through bore.

18. Method according to claim 17, wherein
   the pre-assembled shaft is filled with fluid for the fluid seal during the insertion into the through bore, before the outer bearing is inserted into the through bore, or
   after the full insertion of the pre-assembled shaft into the through bore, fluid is supplied to the annular gap via a cross bore provided in the housing and the cross bore is closed after the filling of the annular gap.

19. Method according to claim 15, wherein an axial and/or radial bearing, preferably having a stopper, is attached on the connecting portion or on the shaft portion facing the connecting portion before the transfer of the shaft into the end position relative to the through bore.

20. Method according to claim 15, wherein within the shaft portion of the shaft, said shaft portion being located in the through bore, at least one free annular gap extending in the axial direction is formed as a compensation chamber.

* * * * *